United States Patent
Birkenstock

(10) Patent No.: US 8,449,239 B1
(45) Date of Patent: May 28, 2013

(54) BRACKET ASSEMBLY FOR VEHICLE WASTE TANK

(76) Inventor: Brian Birkenstock, Rockledge, FL (US)

( * ) Notice: Subject to any disclaimer, the term of this patent is extended or adjusted under 35 U.S.C. 154(b) by 335 days.

(21) Appl. No.: 12/967,646

(22) Filed: Dec. 14, 2010

(51) Int. Cl.
*B60R 15/04* (2006.01)
*B62D 43/04* (2006.01)

(52) U.S. Cl.
USPC .......................... 414/462; 4/321; 224/42.23

(58) Field of Classification Search
USPC ......... 248/128, 130, 185.1, 235, 240, 346.03, 248/346.5, 224.8; 137/899, 351, 354, 581; 220/562; 224/42.21, 42.23; 4/321–323, 458; 414/462–466; 296/156, 164, 168
See application file for complete search history.

(56) References Cited

U.S. PATENT DOCUMENTS

| | | | | |
|---|---|---|---|---|
| 964,217 A * | 7/1910 | Cronk | ............................... | 4/321 |
| 1,042,061 A * | 10/1912 | Webb | ................................ | 4/321 |
| 1,604,456 A * | 10/1926 | Levy | ................................ | 4/323 |
| 1,913,835 A * | 6/1933 | Golike | .......................... | 414/466 |
| 2,631,764 A * | 3/1953 | Brown | ........................ | 224/42.23 |
| 3,570,016 A | 3/1971 | Ellis et al. | | |
| 3,790,012 A * | 2/1974 | Hrivnyak | ....................... | 414/466 |
| 3,862,696 A * | 1/1975 | McCauley et al. | ............. | 414/466 |
| 3,981,323 A * | 9/1976 | Watson | .......................... | 137/899 |
| 4,072,258 A * | 2/1978 | Cruson | ....................... | 224/42.21 |
| 4,384,815 A * | 5/1983 | Suzuki et al. | .................. | 414/466 |
| 4,776,631 A | 10/1988 | Sargent et al. | | |
| 4,974,899 A * | 12/1990 | Sargent | .......................... | 296/156 |
| 5,022,573 A * | 6/1991 | Barkouskie | ................. | 224/42.21 |
| 5,031,249 A * | 7/1991 | Sargent | .............................. | 4/321 |
| 5,056,166 A | 10/1991 | Sargent et al. | | |
| 5,197,641 A * | 3/1993 | Montgomery, Jr. | ......... | 224/42.21 |
| 5,238,358 A * | 8/1993 | Higgins et al. | ................. | 414/463 |
| 5,284,349 A | 2/1994 | Bruns et al. | | |
| 5,346,245 A | 9/1994 | Budrow et al. | | |
| 5,673,940 A * | 10/1997 | Gaisford et al. | .............. | 280/834 |
| 5,860,786 A * | 1/1999 | Aubrecht | ....................... | 414/463 |
| 6,129,117 A | 10/2000 | Eriksson | | |
| 6,189,161 B1 * | 2/2001 | Rijn et al. | .......................... | 4/321 |
| 6,193,124 B1 * | 2/2001 | Brazil et al. | ................... | 224/521 |
| 6,345,749 B1 | 2/2002 | Hamilton | | |
| 7,066,528 B1 | 6/2006 | Crean | | |
| 7,293,298 B2 * | 11/2007 | Cameron et al. | ................... | 4/321 |
| 7,621,565 B2 | 11/2009 | Ross, Jr. | | |
| 2005/0055759 A1 * | 3/2005 | Cameron et al. | ................... | 4/321 |
| 2008/0035654 A1 | 2/2008 | Hall et al. | | |

* cited by examiner

*Primary Examiner* — Terrell McKinnon
*Assistant Examiner* — Ingrid M Weinhold
(74) *Attorney, Agent, or Firm* — Albert Bordas, P.A.

(57) ABSTRACT

A bracket assembly for vehicle waste tanks having first and second longitudinal frame members. The longitudinal frame members each have proximal ends and lateral edges. In addition, the longitudinal frame members each have sidewalls extending therefrom. The sidewalls extend from their respective proximal ends a predetermined distance. Each proximal end has hinge assemblies that mount onto a vehicle. In the preferred embodiment, the bracket assembly for vehicle waste tanks is mounted onto an underside of the vehicle, so that it is not seen and does not obstruct any functionalities of the vehicle, which may be a recreational vehicle having a kitchen, a bathroom, a bedroom and a living room. The vehicle may also be defined as a caravan, camper, or camper van. The vehicle is intended for everything from brief leisure activities such as vacations and camping, to full-time living, for which they are often parked in special trailer parks.

17 Claims, 4 Drawing Sheets

BRACKET ASSEMBLY FOR VEHICLE WASTE TANK

BACKGROUND OF THE INVENTION

1. Field of the Invention

The present invention relates to recreational vehicle accessories, and more particularly, to a bracket assembly for portable waste tanks commonly used with recreational vehicles.

2. Description of the Related Art

Applicant believes that one of the closest references corresponds to U.S. Patent Application Publication No. 2008/0035654, published on Feb. 14, 2008 to Hall, et al. for a portable waste transfer tank. However, it differs from the present invention because Hall, et al. teach a main body portion defining a waste holding chamber, a vent path extending from the waste holding chamber to atmosphere, and a float member. The float member is coupled to the tank for movement between a first position and a second position. The float member is movable from the first position to the second position in response to an increase in fluid level within the storage chamber. The vent passage remains open for venting the storage chamber when the float member is in the first position and is blocks the vent passage in the second position.

Applicant believes that another reference corresponds to U.S. Pat. No. 7,621,565 issued to Ross, Jr. et al. on Nov. 24, 2009 for a container mounting assembly. However, it differs from the present invention because Ross, Jr. et al. teach a mounting assembly for holding and moving a propane cylinder between a first operational position and a second lower loading/unloading position with respect to a support structure of a forklift. The mounting assembly includes a base member adapted for connection to the forklift support structure, a cradle for supporting the cylinder between the first and second positions, and first and second pivot arms having a first end pivotally connected to the base member and a second end pivotally connected to the cradle. In the first position, the cradle is in a generally horizontal orientation. In the second position, the cradle is in a generally vertical orientation. Angular movement of the first and second pivot arms causes rotation of the cradle between the generally horizontal and generally vertical orientations.

Applicant believes that another reference corresponds to U.S. Pat. No. 7,293,298 issued to Cameron, et al. on Nov. 13, 2007 for a self-contained sanitary system for a vehicle. However, it differs from the present invention because Cameron, et al. teach a self-contained sanitary system for a vehicle that includes a toilet with a flush tank for storing a source of flush water. The system further includes a spout in fluid communication with the flush tank. The spout has a first open end coupled to the flush tank and a second open end. The spout is coupled for rotation about a generally vertical axis between a stowed position and an access position. The second end is rotatable relative to the first end about a generally horizontal axis between a fill position and a drainage position. The system further includes a bench and a holding tank. The holding tank is removably associated with the toilet and includes a pair of wheels and a retractable handle.

Applicant believes that another reference corresponds to U.S. Pat. No. 7,066,528 issued to Crean on Jun. 27, 2006 for a slide-out lifting and lowering mechanism. However, it differs from the present invention because Crean teaches a recreational vehicle having a slide-out housing, wherein the slide-out housing may be positioned in either a retracted or deployed configuration. In the deployed configuration, the slide-out housing extends outwardly from a main housing of the recreational vehicle so as to enlarge the living space within the main housing. In the retracted configuration, the slide-out housing extends inwardly into the main housing so as to reduce the living space within the main housing. In various embodiments, the slide-out housing is lifted prior to retraction and lowered after deployment so that the floor of the slide-out housing aligns with the floor of the main housing. In other various embodiments, vertical movement of the slide-out housing may occur during retraction and deployment. Moreover, the recreational vehicle may utilize a vertical actuating assembly that is adapted to engage with the slide-out housing to thereby lift and lower the slide-out housing.

Applicant believes that another reference corresponds to U.S. Pat. No. 6,345,749 issued to Hamilton on Feb. 12, 2002 for a recreational vehicle tank hauling assembly. However, it differs from the present invention because Hamilton teaches a recreational vehicle tank hauling assembly for transporting waste tanks by automotive vehicle without requiring the waste tank to be lifted from the ground. The recreational vehicle tank hauling assembly includes a connection member adapted for coupling to a trailer hitch, an axle extending from the connection member, a deck assembly rotatably coupled to the axle, and a pin for securing the rotation of the deck with respect to the axle.

Applicant believes that another reference corresponds to U.S. Pat. No. 6,189,161 issued to Rijn, et al. on Feb. 20, 2001 for toilet for recreational vehicle with vent for the holding tank. However, it differs from the present invention because Rijn, et al. teach a valve and vent assembly for a self-contained sanitary system of the type including a toilet structure with a downwardly directed outlet opening and a storage compartment defined and located below the outlet opening, and a waste holding tank removably disposed within the storage compartment. The tank has a fill opening positioned in registry with the outlet opening when the tank is inserted within the storage compartment. The valve and vent assembly is operable to close the fill opening and to seal the tank to prevent leakage of waste from the tank through the fill opening, a vent passage in the storage compartment and communicating with the waste holding tank extends outside of said compartment thereby enabling noxious and odorous air in the holding tank to pass out of the tank.

Applicant believes that another reference corresponds to U.S. Pat. No. 6,129,117 issued to Eriksson on Oct. 10, 2000 for a portable holding tank. However, it differs from the present invention because Eriksson teaches a portable tank for handling recreational vehicle liquid waste comprising a molded receptacle of synthetic plastic material having wheels, including a caster wheel. The receptacle is provided with an inlet port for receiving liquid waste, and an outlet port defined in a side of the receptacle is opened and closed by a gate valve permitting the receptacle to be easily emptied.

Applicant believes that another reference corresponds to U.S. Pat. No. 5,346,245 issued to Budrow, et al. on Sep. 13, 1994 for a portable tank with extending handle. However, it differs from the present invention because Budrow, et al. teach a portable tank particularly suitable for handling recreational vehicle liquid waste of relatively large capacity, i.e. 30 gallons, including a receptacle formed of a synthetic plastic material having wheels mounted upon one end of the receptacle and a handle support molded into the lower region of the receptacle telescopingly receiving an extendable and retractable handle. The outer end of the handle telescopingly receives a handle extension having a grip mounted thereon for manually handling the tank, or attachment to a vehicle trailer hitch.

Applicant believes that another reference corresponds to U.S. Pat. No. 5,284,349 issued to Bruns, et al. on Feb. 8, 1994 for a cab step assembly. However, it differs from the present invention because Bruns, et al. teach a crop sprayer cab that has a step assembly facilitating ingress and egress of the operator into and out of the cab. The step assembly has floor and step sections operable for movement between an up, closed position and a down, step position relative to the floor of the cab. Links connected to the cab floor and the floor section limit downward movement of the step section and allow the step assembly to be moved to a closed position. A hand operated lever is operable to pivot the step assembly to the up, closed position.

Applicant believes that another reference corresponds to U.S. Pat. No. 5,056,166 issued to Sargent, et al. on Oct. 15, 1991 for self-contained RV sanitary systems. However, it differs from the present invention because Sargent, et al. teach a self-contained sanitary fixture, particularly for a recreational vehicle, comprising a bench supported on a base cooperatively defining a stowage compartment. The bench contains a bowl having an outlet, which connects, to a tank in the storage compartment. A valve on the tank controls passage between the bowl and the tank. The valve is itself operated from a knob on the bench through a coupling mechanism. Waste water from the bowl is collected in the tank and is disposed of by sliding the tank out of the stowage compartment through an opening in the RV's sidewall and carrying the tank to a suitable disposal site. The tank incorporates a rotatable pourspout and vent valve to facilitate pouring waste contents out of the tank. The connections between the bowl outlet and the tank and between the knob and valve automatically disconnect upon removal of the tank from the stowage compartment. Similarly, they automatically reconnect when the tank is inserted back into the stowage compartment.

Applicant believes that another reference corresponds to U.S. Pat. No. 4,974,899 issued to Sargent on Dec. 4, 1990 for a recreational vehicle use system particularly tank installation. However, it differs from the present invention because Sargent teaches the body of a recreational vehicle (RV) that is configured to have a stowage compartment within the body's interior but separate from the interior occupant space. The stowage compartment contains a tank, which serves water use fixtures in the interior occupant space. The stowage compartment is disposed adjacent the sidewall of the RV body and an opening is provided through the sidewall from the stowage space to the exterior. This opening is closed by a door. When the door is open, the tank can pass through the opening into and out of the stowage space. The tank can be either a fresh water tank containing a supply of fresh water for use at sanitary fixtures in the RV or alternatively it can be a waste water tank of either the gray water or black water type which collects waste from the water use fixtures.

Applicant believes that another reference corresponds to U.S. Pat. No. 4,776,631 issued to Sargent, et al. on Oct. 18, 1988 for self-contained RV sanitary systems. However, it differs from the present invention because Sargent, et al. teach a self-contained sanitary fixture, particularly for a recreational vehicle, comprises a bench supported on a base cooperatively defining a stowage compartment. The bench contains a bowl having an outlet, which connects to a tank in the stowage compartment. A valve on the tank controls passage between the bowl and the tank. The valve is itself operated from a knob on the bench through a coupling mechanism. Waste water from the bowl is collected in the tank and is disposed of by sliding the tank out of the stowage compartment through an opening in the RV's sidewall and carrying the tank to a suitable disposal site. The tank incorporates a rotatable pourspout and vent valve to facilitate pouring waste contents out of the tank. The connections between the bowl outlet and the tank and between the knob and valve automatically disconnect upon removal of the tank from the stowage compartment. Similarly, they automatically reconnect when the tank is inserted back into the stowage compartment.

Applicant believes that another reference corresponds to U.S. Pat. No. 3,981,323 issued to Watson on Sep. 21, 1976 for a removable fluid holding tank for vehicle. However, it differs from the present invention because Watson teaches a removable waste fluid holding tank for use with a vehicle. A pair of U-shaped supports straps are suspended below the body of the vehicle with the base portion of the strap farthest inwardly from the side of the vehicle lower than the other strap. The tank is constructed to rest on the straps under the body of the vehicle and has an indentation in its base for receiving a portion of one of the straps to inhibit horizontal removal of the tank from the straps. The tank has inlet and vent connections at one end thereof to which drain and vent conduits may connect the tank to plumbing in the vehicle. Within the tank, a conduit connects the inlet opening with the base of the tank. A handle is provided for lifting the tank slightly to release it from the strap, allowing it to be pulled horizontally therefrom after such release.

Applicant believes that another reference corresponds to U.S. Pat. No. 3,570,016 issued to Ellis, et al. on Mar. 16, 1971 for a portable chemical toilet system. However, it differs from the present invention because Ellis, et al. teach a portable toilet system mounted on a railroad car including a toilet housing compartment positioned within the railroad car and having a receiving tank positioned therein adapted to contain a liquid chemical solution for decomposing purposes and a toilet seat having an opening therethrough mounted in the compartment. The receiving tank has a passageway communicating with the toilet seat opening and is adapted and arranged to receive excrement from the toilet seat opening. The system also includes an enclosed holding tank positioned below the receiving tank and exteriorly of the railroad car therebeneath, which is adapted and arranged to receive and hold periodic discharges of the contents of the receiving tank after excreta has built up therein, and passage means communicating between the tanks with selectively operable valve means positioned in the passage means for transferring the contents of the receiving tank into the holding tank. The handle of the valve means is inaccessible to the user of the toilet within the compartment and is operable from a position exteriorly of the railroad car.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a bracket assembly for vehicle waste tanks having a cooperative shape and dimension to receive a portable waste tank thereon.

It is another object of this invention to provide a bracket assembly for vehicle waste tanks that keep the waste tank conveniently stored underneath a vehicle.

It is another object of this invention to provide a bracket assembly for vehicle waste tanks that is volumetrically efficient for carrying, transporting, and storage thereof.

It is another object of this invention to provide a bracket assembly for vehicle waste tanks made of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
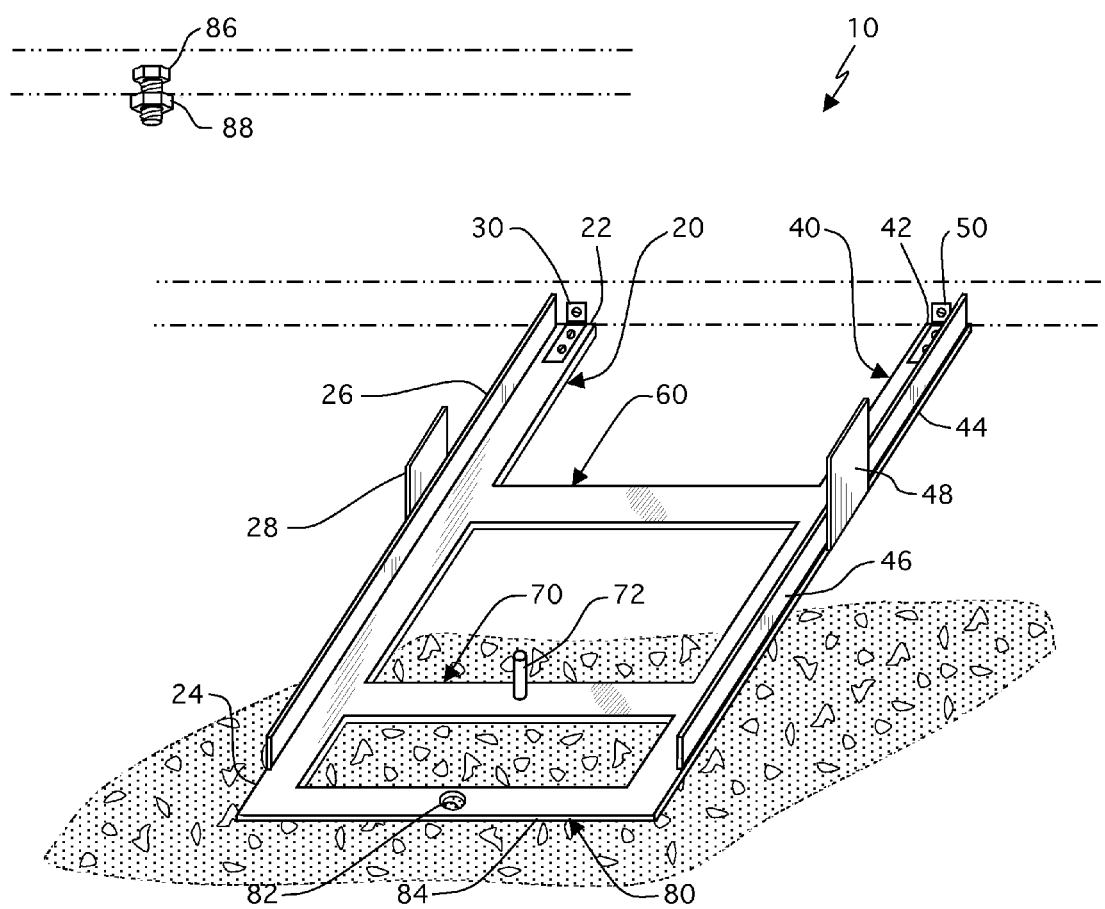
FIG. 1 is an isometric view of the instant invention, mounted underneath a recreational vehicle, and in a deployed configuration.

Referring now to the drawings, the present invention is generally referred to with numeral 10. It can be observed that it basically includes longitudinal frame members 20 and 40, forward transversal member 60, intermediate transversal member 70, and aft transversal member 80.

Figure 2:
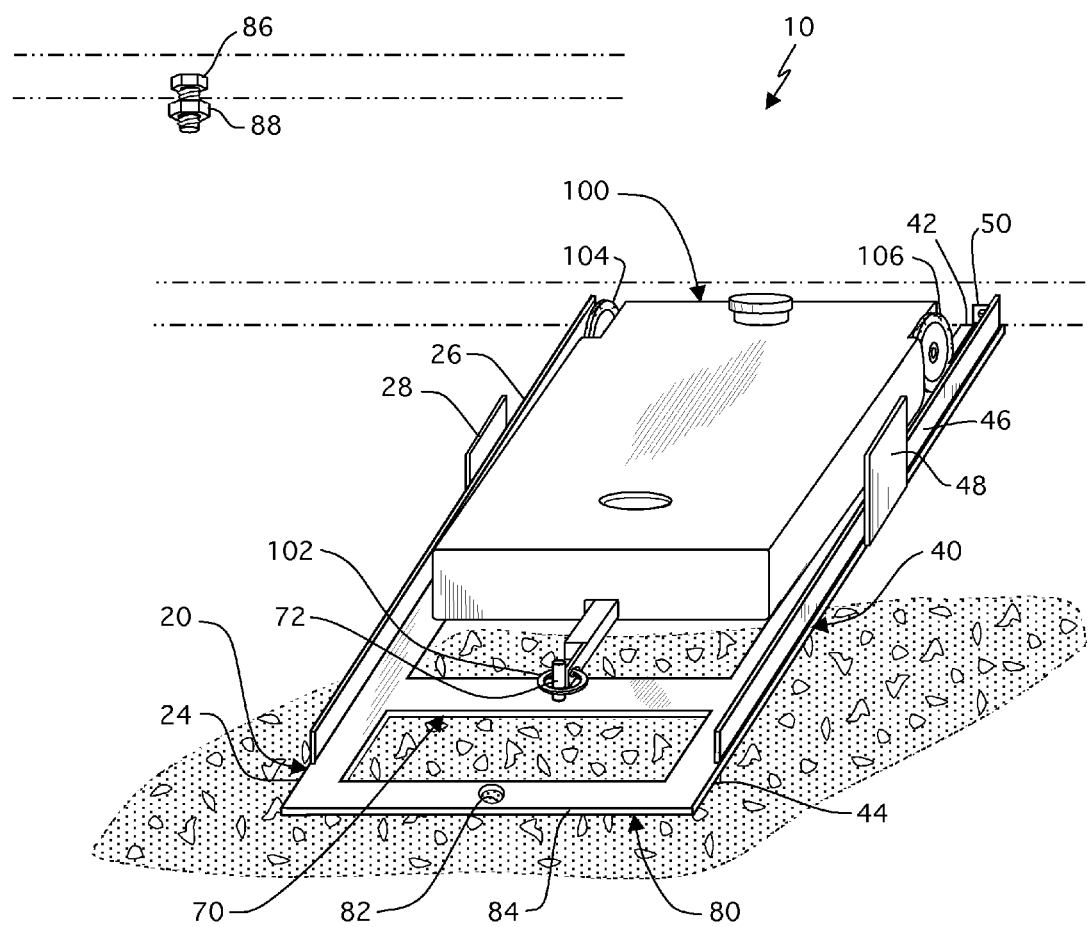
FIG. 2 is an isometric view of a vehicle waste tank mounted onto the instant invention in the deployed configuration.

As seen in FIGS. 1 and 2, instant invention 10 comprises at least first and second longitudinal frame members 20 and 40. Longitudinal frame members 20 and 40 each have a proximal end 22 and 42 respectively. Longitudinal frame members 20 and 40 also have lateral edges 24 and 44 respectively. In addition, longitudinal frame members 20 and 40 each have sidewalls 26 and 46 respectively extending therefrom. Sidewalls 26 and 46 extend from their respective proximal end 22 and 42 respectively, a predetermined distance. Each proximal end 22 and 42 has hinge assembly 30 and 50 respectively that mounts onto a vehicle, such as vehicle RV seen in FIG. 4.

In the preferred embodiment, instant invention 10 is mounted onto an underside of the vehicle RV, so that it is not seen and does not obstruct any functionalities of the vehicle RV while stowing portable waste tank 100, seen in FIG. 2. In the preferred embodiment, the vehicle RV is a recreational vehicle, including but not limited to a vehicle that may have a kitchen, a bathroom, a bedroom and a living room. The vehicle may also be defined as a caravan, camper, or camper van. The vehicle is intended for everything from brief leisure activities such as vacations and camping, to full-time living, for which they are often parked in special trailer parks.

At least one forward transversal member 60 extends between at least first and second longitudinal frame members 20 and 40. At least one intermediate transversal member 70 extends between at least first and second longitudinal frame members 20 and 40. At least one intermediate transversal member 70 comprises at least one pin member 72 protruding therefrom. At least one aft transversal member 80 extends between at least first and second longitudinal frame members 20 and 40. At least one aft transversal member comprises at least one through hole 82.

In a preferred embodiment, at least first and second longitudinal frame members 20 and 40 are parallel to each other. At least first and second longitudinal frame members 20 and 40 are perpendicular to at least one forward transversal member 60, at least one intermediate transversal member 70, and at least one aft transversal member 80. In a preferred embodiment, at least first and second longitudinal frame members 20 and 40, at least one forward transversal member 60, at least one intermediate transversal member 70, and at least one aft transversal member 80 are all on a same plane.

Sidewalls 26 and 46 are perpendicular to at least first and second longitudinal frame members 20 and 40 to form general "L" shapes. Sidewalls 26 and 46 extend from their respective proximal ends 22 and 42 respectively a predetermined distance without reaching aft edge 84. In a preferred embodiment, support restraint walls 28 and 48 are biased against sidewalls 26 and 46 respectively.

As seen in FIG. 2, at least one pin member 72 protrudes from at least one intermediate transversal member 70 and is sufficiently long to engage handle 102 of portable waste tank 100. Portable waste tank 100 also comprises wheels 104 and 106. At least one support restraint walls 28 and 48 are positioned between proximal ends 22 and 42 and aft edge 84. At least first and second longitudinal frame members 20 and 40 extend downwardly at a predetermined angle from hinge assemblies 30 and 50 when in a deployed configuration. In the deployed configuration, aft edge 84 contacts the ground upon which the vehicle RV is upon to receive portable waste tank 100.

Figure 3:
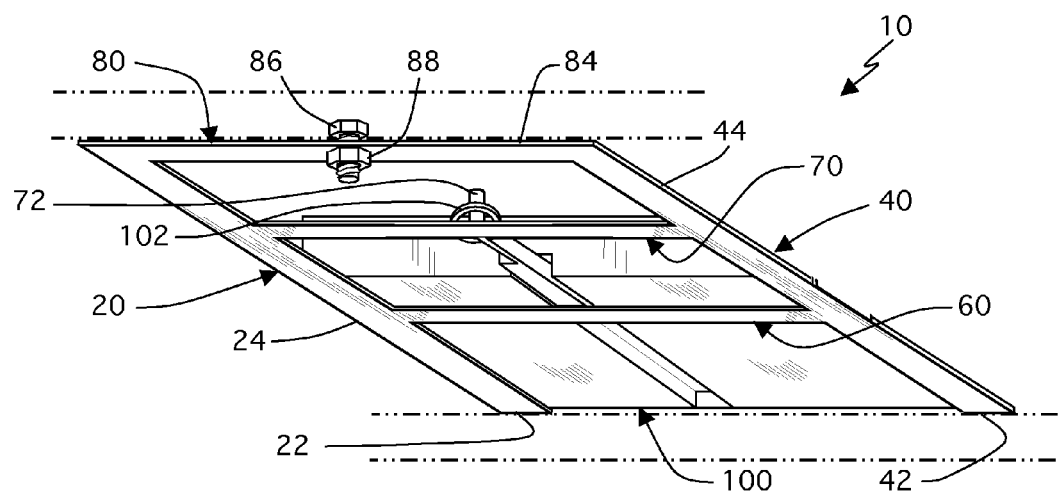
FIG. 3 is a bottom isometric view of the vehicle waste tank mounted onto the instant invention that is in a retracted configuration and secured.
Figure 4:
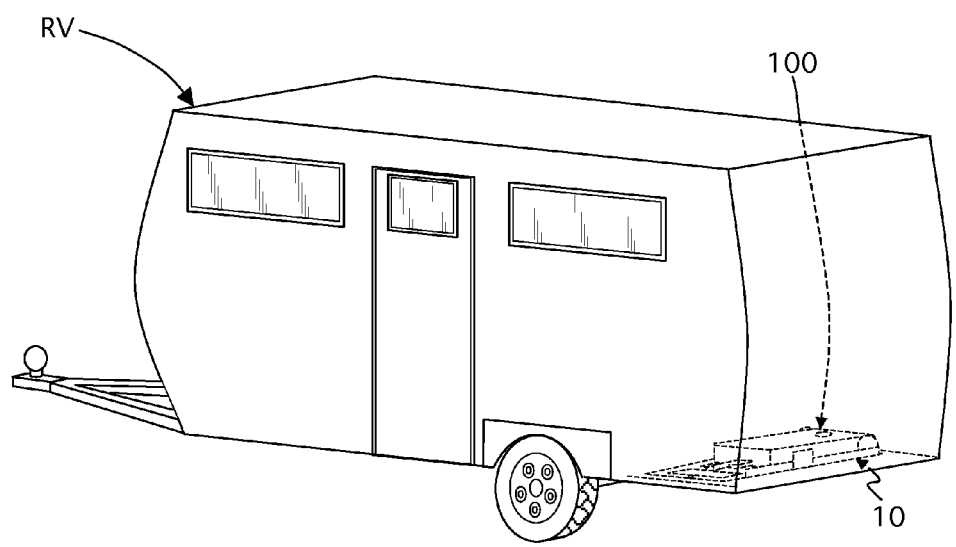
FIG. 4 is an isometric view of a recreational vehicle with the vehicle waste tank mounted onto the instant invention in the retracted configuration and secured.
Figure 5A:
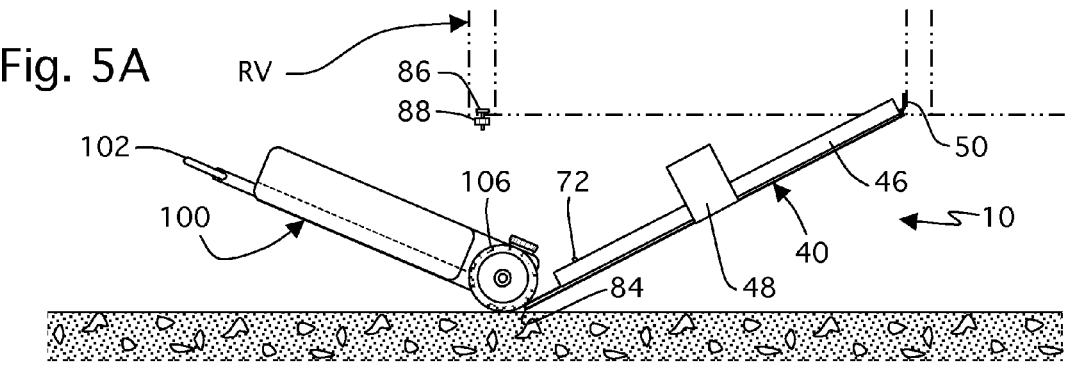
FIG. 5A is a first elevational side view of the instant invention in the deployed configuration receiving a vehicle waste tank thereon.
Figure 5B:
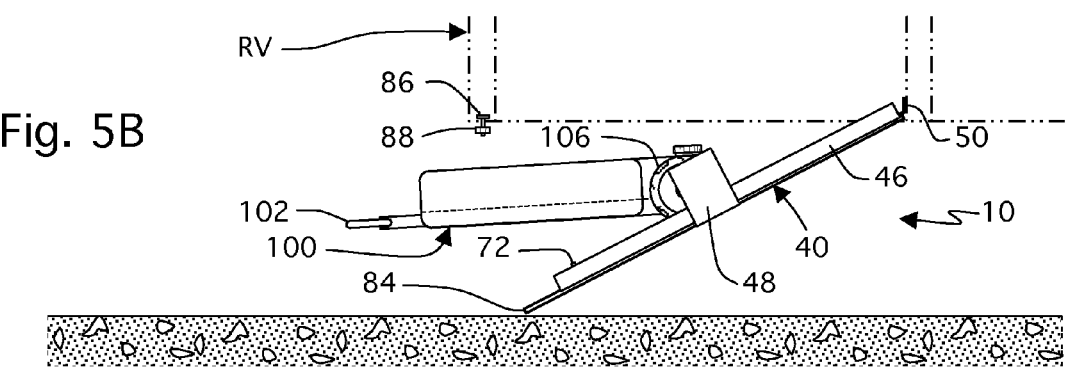
FIG. 5B is a second elevational side view of the instant invention in the deployed configuration receiving the vehicle waste tank thereon.
Figure 5C:
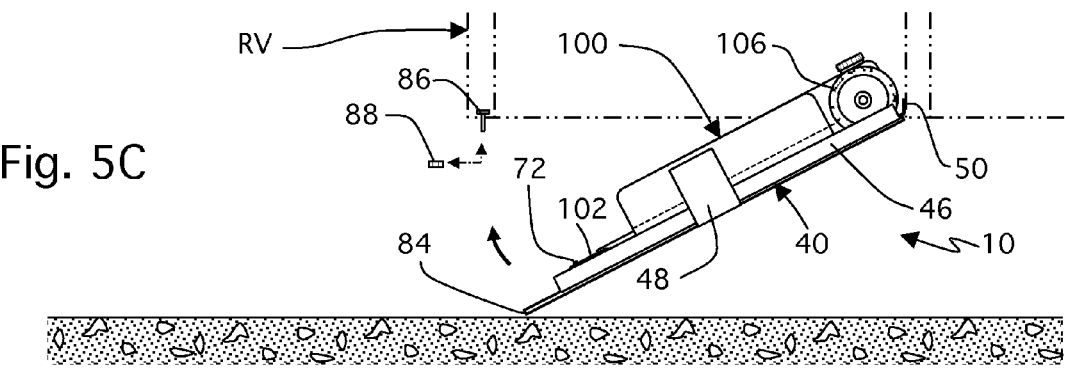
FIG. 5C is an elevational side view of the instant invention in the deployed configuration with the vehicle waste tank mounted thereon.
Figure 5D:
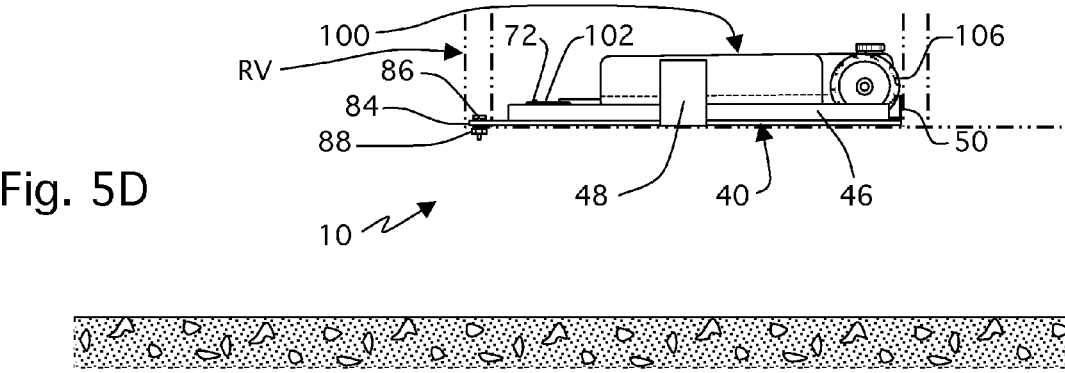
FIG. 5D is an elevational side view of the instant invention in the retracted configuration and secured with the vehicle waste tank mounted thereon.

As seen in FIGS. 3 and 4, at least first and second longitudinal frame members 20 and 40 are in an approximately horizontal position when in a retracted configuration. An approximated horizontal position may be defined as completely horizontal but does not necessarily have to be. At least first and second longitudinal frame members 20 and 40 can just as well be inclined towards forward transversal member 60 or aft transversal member 80 and still effectively stow portable waste tank 100 while in the retracted position.

At least one through hole 82 receives locking means from the vehicle RV to lock at least first and second longitudinal frame members 20 and 40, and specifically aft transversal member 80 in the retracted configuration. The locking means can be locking member 86, extending from the vehicle RV such as a bolt, hook, clamp, and nut 88 as an example.

As seen in FIGS. 5A, 5B, 5C, and 5D, a portable waste tank, such as portable waste tank 100, may be effectively stowed away beneath a vehicle RV without obstructing any functionalities of the vehicle RV. From the retracted configuration, nut 88 is removed from locking member 86 to place instant invention 10 in the deployed configuration, whereby aft edge 84 contacts the ground. Portable waste tank 100, and specifically, wheels 104 and 106 are aligned with at least first and second longitudinal frame members 20 and 40. A force is placed upon portable waste tank 100 to cause it to travel upon at least first and second longitudinal frame members 20 and 40 until handle 102 is positioned over pin member 72. Sidewalls 26 and 46 serve as a guide to prevent portable waste tank 100 from derailing. Handle 102 is then placed onto pin member 72 to engage it. Aft edge 84 is then raised to the retracted configuration and nut 88 is secured onto locking member 86, thus effectively stowing portable waste tank 100 underneath the vehicle RV.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A bracket assembly for vehicle waste tank, comprising:
   A) at least first and second longitudinal frame members, each having a proximal end, each said at least first and second longitudinal frame members also having lateral edges, and sidewalls extending from said lateral edges, each of said sidewalls also extending from a respective said proximal end a first predetermined distance, each said proximal end having a hinge assembly that mounts onto a vehicle, said at least first and second longitudinal frame members each further comprising at least one support restraint wall, said at least one support restraint wall being biased against said sidewalls;
   B) at least one forward transversal member that extends between said at least first and second longitudinal frame members;
   C) at least one intermediate transversal member that extends between said at least first and second longitudinal frame members, said at least one intermediate transversal member comprising at least one pin member protruding therefrom;
   D) at least one aft transversal member that extends between said at least first and second longitudinal frame members, said at least one aft transversal member comprising an aft edge and at least one through hole, said sidewalls extending from respective said proximal ends said first predetermined distance without reaching said aft edge, said at least one support restraint wall being positioned between each said proximal end and said at least one aft transversal member; and
   E) a portable waste tank comprising at least two wheels and a handle.

2. The bracket assembly for vehicle waste tank set forth in claim 1, further characterized in that said at least first and second longitudinal frame members are parallel to each other.

3. The bracket assembly for vehicle waste tank set forth in claim 1, further characterized in that said at least first and second longitudinal frame members are perpendicular to said at least one forward transversal member.

4. The bracket assembly for vehicle waste tank set forth in claim 1, further characterized in that said at least first and second longitudinal frame members are perpendicular to said at least one intermediate transversal member.

5. The bracket assembly for vehicle waste tank set forth in claim 1, further characterized in that said at least first and second longitudinal frame members are perpendicular to said at least one aft transversal member.

6. The bracket assembly for vehicle waste tank set forth in claim 1, further characterized in that said at least one pin member protruding from said at least one intermediate transversal member is sufficiently long to engage said handle of said portable waste tank.

7. The bracket assembly for vehicle waste tank set forth in claim 1, further characterized in that said hinge assembly mounts onto an underside of said vehicle to stow said portable waste tank.

8. The bracket assembly for vehicle waste tank set forth in claim 1, further characterized in that said at least first and second longitudinal frame members extend downwardly at a predetermined angle from said hinge assembly when in a deployed configuration.

9. The bracket assembly for vehicle waste tank set forth in claim 8, further characterized in that said deployed configuration, said aft edge of said at least one aft transversal member makes contact with ground upon which said vehicle is upon to receive said portable waste tank.

10. The bracket assembly for vehicle waste tank set forth in claim 1, further characterized in that said at least first and second longitudinal frame members are in an approximately horizontal position when in a retracted configuration.

11. The bracket assembly for vehicle waste tank set forth in claim 1, further characterized in that said at least one through hole receives locking means from said vehicle to lock said at least first and second longitudinal frame members in said retracted configuration.

12. A bracket assembly for vehicle waste tank, comprising:
    A) at least first and second longitudinal frame members, each having a proximal end, each said at least first and second longitudinal frame members also having lateral edges, and sidewalls extending from said lateral edges, each of said sidewalls also extending from a respective said proximal end a first predetermined distance, each said proximal end having a hinge assembly that mounts onto a vehicle, said sidewalls being perpendicular to said at least first and second longitudinal frame members;
    B) at least one forward transversal member that extends between said at least first and second longitudinal frame members;
    C) at least one intermediate transversal member that extends between said at least first and second longitudinal frame members, said at least one intermediate transversal member comprising at least one pin member protruding therefrom;
    D) at least one aft transversal member that extends between said at least first and second longitudinal frame members, said at least one aft transversal member comprising an aft edge and at least one through hole, said at least first and second longitudinal frame members each further comprise at least one support restraint wall positioned between each said proximal end and said at least one aft transversal member, said at least one support restraint wall being biased against said sidewalls, each said sidewall extends from respective said proximal end said first predetermined distance without reaching said at least one aft transversal member; and
    E) a portable waste tank comprising at least two wheels and a handle.

13. The bracket assembly for vehicle waste tank set forth in claim 12, further characterized in that said at least one pin member protruding from said at least one intermediate transversal member is sufficiently long to engage said handle of said portable waste tank.

14. The bracket assembly for vehicle waste tank set forth in claim 13, further characterized in that said hinge assembly mounts onto an underside of said vehicle to stow said portable waste tank.

15. The bracket assembly for vehicle waste tank set forth in claim 12, further characterized in that said at least first and second longitudinal frame members extend downwardly at a predetermined angle from said hinge assembly when in a deployed configuration, in that said deployed configuration, at least one aft edge of said aft transversal member makes contact with ground upon which said vehicle is upon to receive said portable waste tank.

16. The bracket assembly for vehicle waste tank set forth in claim 12, further characterized in that said at least first and second longitudinal frame members are in an approximately horizontal position when in a retracted configuration.

17. The bracket assembly for vehicle waste tank set forth in claim 16, further characterized in that said at least one through hole receives locking means from said vehicle to lock said at least first and second longitudinal frame members in said retracted configuration.

\* \* \* \* \*